3,700,495
PROCESS FOR COATING SUBSTRATES WITH POLYETHYLENE AND PRODUCTS PRODUCED THEREBY
Jurgen M. Kruse, Lincoln, and John E. Wyman, Lexington, Mass., assignors to Itek Corporation, Lexington, Mass.
No Drawing. Filed Mar. 30 1970, Ser. No. 31,029
Int. Cl. B44d 1/08; C09d 3/60
U.S. Cl. 117—104 R                    8 Claims

ABSTRACT OF THE DISCLOSURE

This invention is concerned with direct coating of polyethylene on surfaces, particularly heat-sensitive surfaces, by forming a layer of a solution of polyethylene on the surface and thereafter allowing the solvent to evaporate. Additionally, it provides new heat sensitive substrates with polyethylene coatings directly bonded to the surface of the substrate.

BACKGROUND OF THE INVENTION

(1) Field of the invention

This invention relates to polyethylene coating processes and products obtained thereby.

(2) Description of prior art

The general methods of applying polyethylene coatings to substrates to be coated involves the application of usually highly concentrated solutions of polyethylene in suitable solvents with formation of a polyethylene gel on said surface after which the polyethylene gel coating after solvent removal is cured at elevated temperatures to obtain fairly uniform, adherent coatings. For example, U.S. Pat. 2,384,848 describes the use of thixotropic solutions of polyethylene in hydrocarbon or chlorinated hydrocarbon solvent in spray coating of substrates after which the coated substrate is heated to cure the thus deposited polyethylene. In U.S. Pat. 2,429,861, the process involves hot-dip-coating of a mixture of polyethylene and a solvent having a boiling point of 150° to 300° C. and which dissolves polyethylene at a temperature above 120° C., after which baking at elevated temperatures gives the final coating. In U.S. Pat. 2,737,461, normally solid polyethylene powder is applied to hot metal surfaces to form coatings thereon. U.S. Pat. 2,313,144 discloses the use of trichloroethylene as a solvent for polyethylene.

In all, the prior art methods for coating polyethylene on substrates are predicated on heating the substrate before, during or after application of the coating composition. Such methods of coating substrates therefor are limited by several factors, the major factors being the heat-sensitivity of the substrate and the ease of heating the substrate even when not heat-sensitive.

Heat-sensitive substrates have been coated heretofore with polyethylene only when intermediate adhesive layers able, it is of considerable impracticality to consider coating, a film or sheet of polyethylene can be applied but there is no direct bonding between the substrate and polyethylene and the resulting coated substrate can suffer failures due to the adhesive selected and the ambient conditions of use.

When the substrate is not readily or practically heatable, it is of considerable impracticality to consider coating with polyethylene, e.g. boat hulls and parts, large objects, and the like, because of the obviously high heat energy requirements.

Thus, a coating process which does not require heating as an integral step is very desirable, particularly a process which gives adherent coatings comparable to those obtained by heat curing.

SUMMARY OF THE INVENTION

This invention relates to a new coating process particularly suited for direct coating of heat-sensitive substrates, preferably where the temperature of the substrate is below about 70° C. with polyethylene as the coating material. The process of this invention includes the step of forming a layer of a solution of polyethylene on the surface of the substrate and allowing the solvent of the coating solution to evaporate. The solution layer is best formed by spray techniques which form the solution layer on the surface to be coated, and permit control of the coating thickness.

The solvent employed must boil at less than about 100° C. and maintain the polyethylene in solution at a temperature below about 70° C. when applied to the surface to be coated and preferably maintain the polyethylene in solution at temperatures ranging down to about 30° C. on the surface of the substrate. With such a solvent, the solution of polyethylene formed therewith will form excellent coatings and, with the preferred spraying, the coating can be readily varied from thicknesses of less than 1 mil up to any desired thickness, preferably the thicker coatings being obtained by repeated spray applications.

The present process can be used to coat heat-sensitive substrates which cannot withstand the usual high temperatures employed in the art-recognized coating techniques, or to coat objects which it would be impractical to heat or impossible to heat, though not heat-sensitive. Heat-sensitive substances include, for example, plastic materials, synthetic fabrics and the like, or, in general, organic surfaces. In general, heat-sensitive substrates comprise any surfaces which would chemically change or lose dimensional stability at elevated temperatures, e.g., as required for prior art coating processes.

Objcts impractical to heat or impossible to heat, though not heat-sensitive, should be quite obvious, e.g. large metal surfaces of great area such as a ship hull or exposed ship parts which can be coated according to the present process but not by prior art procedures which require heating of the substrate. Further, selective coating of substrates can also be accomplished with the present process on any kind of suitable surface, regardless of heat sensitivity or stability.

The present process can be used in coating boat hulls and parts, leather, including synthetic leather, tanks and pipes which are in contact with food, large surfaces which should be hydrophobic such as textile fabrics, surfaces which should be resistant to caustic or acids e.g. pipes, trays, and the like, and, in general, in the same kinds of coating applications and uses as the well-known polyfluorohydrocarbons, e.g. Teflon, except where the coated surface is to be used at high temperatures.

The coatings obtained by the present process have excellent bonding to the substrate, for example, coating adhesions comparable to those obtained by baking or heat-curing methods. In particular, thin coatings of polyethylene, even under 1 mil in thickness, have excellent bonding to the substrate.

The solvent employed should have no adverse effect on the surface to be coated, i.e. should be substantially non-reactive with the surface, under the conditions selected for the coating process. Obviously, the solvent should not destroy or significantly mar the surface, although it is desirable that the solvent etch the surface to permit more adherent bonding of the coating, which is very desirable.

DESCRIPTION OF PREFERRED EMBODIMENTS

In its preferred form, the present process is accomplished using spraying techniques which give uniform coatings and permit facile control of the coating thickness alternatively, dipping or flow coating can also be used but the spraying gives best results in most cases.

In spraying the substrate, art-recognized methods can be employed. Thus, air spraying can be used, or, preferably, air-less spraying in which the coating solution is maintained under pressure and released through a spray orifice. It is preferred to use a heated sprayer to maintain the spraying solution at optimum temperature, and minimize the cooling effect of spraying.

In spraying the substrate, the optimum temperature conditions are used to insure desired results. The temperature of the spraying solution should be at or below about 70° C. when contacting the surface to be coated, while the minimum temperature can range down to as low as room temperature, and even lower. With the usual concentration of spraying solutions, e.g. about 5% weight by volume (w./v.), temperature below about 30° C. are preferably avoided because of a tendency toward gel formation. With dilute coating solutions, e.g. about 1% w./v., temperatures below 20° C. can be tolerated. For general purpose, the temperature in the spraying solution should be in the range from about 30° to about 70° C. The surface of the substrate should preferably be maintained at ambient temperature, e.g. at room temperature to allow for controlled solvent evaporation.

To obtain a coating adherently bonded to the substrate, it is necessary to prevent the solution from gelling until after the surface of the object to be coated has been wetted by the solution and preferably until the solvent has substantially evaporated. To prevent gelling of the solution too soon it may be necessary to vary the concentration or temperature of the solution, or vary the temperature of the atmosphere or the surface of the substrate being coated. At ordinary ambient conditions, it is preferred to maintain the solution temperature at about 70° C. in order to avoid gelling on contact of the solution and substrate being coated.

The solution of polyethylene for use in the present process should comprise a solvent which boils at less than about 100° C. at normal pressure, and maintains the polyethylene in solution at temperatures below about 70° C. without gel formation, i.e. remains a true solution in the said temperature range. With proper precautions during the spray application, the temperatures of the solution can be controlled within defined preferred ranges to ensure formation of a layer of polyethylene solution on the surface of the substrate rather than a gel. The gel does not give uniform, adherent coatings on the substrate and, as is known in the art, requires heat treatment of the coating to obtain either useful or desirable physical properties. Thus, the selection of solvent and optimum temperatures, as described, should be predicated primarily on the basis of maintaining a true solution of polyethylene, and, at the same time, thus avoid gel formation. Consequently, solvents operable in the present process can readily be determined by simple determination of the solubility of polyethylene in the test solvent, which is first selected on the basis of its normal boiling temperature, i.e. below about 100° C. The polyethylene should be soluble in the solvent chosen in an amount between 1 gram and 10 grams per 100 milliliters at 70° F. The determination can be accomplished readily by routine laboratory determination such as commonly used in determining the solubility of solutes in a solvent. The selection of operable solvents thus is readily accomplished by applying the aforesaid criteria.

At the present time, the preferred solvents are polyhalogenated hydrocarbons, especially polychlorinated hydrocarbons which are readily available. Of these, the most preferred solvent is trichloroethylene, which is most eminently suited because of the solubility of polyethylene therein and because of the excellent coatings obtained therewith. Tetrachloroethylene can also be used in this process but the results obtained therewith are not as desirable as trichloroethylene, due to its high boiling point. Carbon tetrachloride is also operable but due to its toxicity may not be desirable unless venting of the vapors is possible.

As previously mentioned, the present process is especially suited for coating of heat-sensitive substrates. Such substrates will, of necessity, include polystyrene articles or surfaces, or in general, plastic substrates or surfaces, especially including styrene polymer articles which are commonly used as replacements for metal articles, e.g. trays, containers and the like. In such uses, it is often desirable to render at least a part of the surface, and, most times, an entire surface, hydrophobic and/or resistant to corrosive liquids such as acids or bases. Although, adhesively-bonded polyethylene coatings are known in the art, direct polyethylene coating of such articles has heretofore never been possible and/or practical in view of the heat-sensitivity of the plastic article. With the present process, excellent coatings are applied directly to such substrates without adhesives, the outstanding property being excellent adhesion of the polyethylene to the substrate, even with coatings of about 1 mil thickness. The thus coated substrates have outstanding resistance to chemical corrosion, particlarly against acids or bases. The process of this invention provides heat-sensitive substrates with an adherent layer of polyethylene directly bonded to at least part of surface thereof.

Similar to the aforesaid plastic substrates, textile fabrics are also readily coated with polyethylene by the present process particularly to render them water-resistant. Leathers for apparel use can similarly be coated to render them water-resistant.

The present coating solutions may also contain additional materials to improve the resultant coatings of polyethylene. For example, soluble stabilizers for polyethylene can be incorporated into the coating solution, or compatible dyes or colors can be used.

The following examples further illustrate the invention.

EXAMPLE 1

A Moyno pump is connected to a Grayco circulating high pressure spray gun, with the lead and return tubing wrapped with heating tape. A solution of polyethylene in trichloroethylene (5% w./v.) is then sprayed with this arrangement on the surface to be coated working at relatively close range i.e. from 3 to 5 inches from the surface. The temperature of the solution in the spray gun is usually at about 60–70° C., which temperature is generated by the friction of the pump employed at 200 to 300 lbs./sq. in. pressure. The spray temperature is measured at between 30°–40° C.

Cold, room temperature surfaces of glass and metal accepted a thin coating that dried in uniform lumps with a thin membrane connecting the nodules. At 30° C. surface temperature of the metal and glass surfaces the coating became very uniform and the adhesion, after thorough drying under ambient conditions for 24 hours, is good. On grained metal surfaces, the adhesion is better.

EXAMPLE 2

A porcelain surface, after thorough cleaning, is immersed in a 5% w./v. solution of polyethylene in trichloroethylene at 30–40° C. and then allowed to dry to obtain an adherent coating of polyethylene on the porcelain surface.

Similar results are obtained using carbon tetrachloride as the solvent for the coating solution.

EXAMPLE 3

A tray made of polystyrene is sprayed according to the procedure of Example 1 with the tray at room temperature. A good adhesive coating of polyethylene is produced in the coated areas of the tray.

EXAMPLE 4

Using the procedure of Example 1, polyester surfaces, paper and wood surfaces at room temperature are coated with polyethylene to obtain reasonably adherent coatings approaching those obtained with metal surfaces in overall adherence.

EXAMPLE 5

Leather surfaces (natural and synthetic) at room temperature are coated on a curtain coater using the procedure of Example 1, on drying, all samples buff to a high polish with excellent adhesion, although coatings applied in several applications i.e. repeat of the spraying operation several times show a tendency to crack.

When the procedure of Example 1 is used with leather surfaces, similar coatings are obtained.

EXAMPLE 6

An air sprayer is used to spray surfaces as described in the preceding examples. Comparable results are obtained with spraying at close range e.g. about 3 inches from the work surface. When the range is increased, there is a tendency for the spray to form a wide fan which results in excessive solvent evaporation, chilling the coating solution to a temperature where a nodular surface of polyethylene tends to form with 5% w./v. solution. However, the nodular surface tendency is obviated by use of a 1% w./v. solution even when the spray cools to less than 30° C., e.g. even as low as 5° C.

When a diluent solvent such as methylchloroform or carbon tetrachloride is used with trichloroethylene solutions, this tendency to nodular surface formation is further minimized, especially at temperatures below 30° C.

The polyethylene employed in the present process is that commonly used in coating processes as described in the prior art, i.e. low density polyethylene of about 20% crystallinity.

What is claimed is:

1. A process for forming an adherent coating of polyethylene on a substrate at a low temperature, comprising:
   (a) forming a polyethylene solution by adding a low density polyethylene to a solvent which boils at less than 100° C. at atmospheric pressure and which has a polyethylene solubility of between about 1 gram and about 10 grams per 100 milliliters of solvent at 70° C.;
   (b) applying said polyethylene solution to a substrate at a maximum temperature of 70° C.; and
   (e) evaporating said solvent.
2. A process of claim 1 wherein said solvent comprises a polyhalogenated hydrocarbon.
3. A process of claim 2 wherein said polyhalogenated hydrocarbon comprises trichloroethylene.
4. A process of claim 3 wherein said solution is applied to said substrate by spraying.
5. A process of claim 4 wherein the temperature of said sprayed solution is between about 30° C. and about 40° C.
6. A process of claim 5 wherein the substrate comprises a heat-sensitive material which is adversely affected by a temperature above about 70° C.
7. A process of claim 6 wherein said substrate comprises polystyrene.
8. A process of claim 7 wherein said low density polyethylene has about 20% crystallinity.

References Cited
UNITED STATES PATENTS

| | | | |
|---|---|---|---|
| 2,898,233 | 8/1959 | Hmiel | 117—161 UF |
| 2,313,144 | 3/1943 | Gomm | 117—161 UF |
| 2,153,553 | 4/1939 | Fawcett et al. | 117—161 UF |
| 3,462,293 | 8/1969 | Voris | 117—138.8 U |
| 2,384,848 | 9/1945 | Peters | 117—161 UF |
| 2,429,861 | 10/1947 | Woodbridge | 117—161 UF |
| 2,737,461 | 3/1956 | Heisler et al. | 117—18 |
| 2,384,848 | 9/1945 | Peters | 117—161 UF |
| 3,196,040 | 7/1965 | Kane | 117—161 UF |
| 3,423,225 | 1/1969 | Coney et al. | 117—161 UF |
| 3,524,753 | 8/1970 | Sharp | 117—161 UF |
| 3,037,949 | 6/1962 | Bonivicini | 260—4 |
| 2,406,039 | 8/1946 | Roedel | 117—161 UF |
| 3,109,750 | 11/1963 | Roche | 117—104 R |
| 3,382,089 | 5/1968 | Klein et al. | 117—104 R |
| 3,565,665 | 2/1971 | Stranch et al. | 117—21 |
| 2,647,464 | 8/1953 | Ebert | 96—1.4 |

WILLIAM D. MARTIN, Primary Examiner

M. SOFOCLEOUS, Assistant Examiner

U.S. Cl. X.R.

117—138.8 UA, F, 142, 148, 161 UF, 155 UA, 123 D